US00RE39285E

(19) United States
(12) Reissued Patent
Stutz et al.

(10) Patent Number: US RE39,285 E
(45) Date of Reissued Patent: Sep. 12, 2006

(54) METHOD AND SYSTEM FOR DYNAMICALLY GENERATING OBJECT CONNECTIONS

(75) Inventors: David S. Stutz, Redmond, WA (US); Christopher A. Zimmerman, Bellevue, WA (US)

(73) Assignee: Microsoft Corporation, Redmond, WA (US)

(21) Appl. No.: 09/008,241

(22) Filed: Jan. 16, 1998

Related U.S. Patent Documents

Reissue of:
(64) Patent No.: 5,485,617
Issued: Jan. 16, 1996
Appl. No.: 08/166,976
Filed: Dec. 13, 1993

(51) Int. Cl.
*G06F 9/44* (2006.01)

(52) U.S. Cl. ..... 719/315
(58) Field of Classification Search ..... 709/310–332; 719/310–320, 328–330
See application file for complete search history.

(56) References Cited

U.S. PATENT DOCUMENTS 4,800,488 A 1/1989 Agrawal et al. ..... 709/225
5,303,379 A * 4/1994 Khoyi et al. ..... 717/10
5,305,461 A * 4/1994 Feigenbaum et al. ..... 712/225

(Continued)

FOREIGN PATENT DOCUMENTS

EP A-O 369 961 5/1990
EP A-O 474 339 3/1992
EP A-O 495 279 7/1992
EP A-O 546 682 6/1993
JP 5-324339 7/1993

OTHER PUBLICATIONS

"Ole 2.0 Part II: Implementing a Simple Windows Object Using Either C or C ++", by Brockschmidt, Kraig, Microsoft Systems Journal, p. 49, Sep. 1993.*

Vinoski S., "Distributed Object Computing with CORBA." C++ Report. vol. 5, No. 6, ISSN 1040–6042, pp. 32–38, 1993.

(Continued)

*Primary Examiner*—St. John Courtenay, III
(74) *Attorney, Agent, or Firm*—Klarquist Sparkman, LLP

(57) ABSTRACT

A method and system for dynamically generating object connections is provided. In a preferred embodiment, a connection can be generated between a source object and a sink object using a connection point object. A source object has connection point objects where each connection point object corresponds to a particular interface. A sink object implements one or more notification interfaces for connecting to a source object. A connection point object of a source object can connect to multiple notification interfaces, which belong to one or more sink objects. A connection point object keeps track of pointers to the notification interfaces to which it has been connected. In order to generate a connection, a sink object requests from a sauce object a connection point object corresponding to a particular interface. The source object determines whether it supports such a connection point object, and if so returns a pointer to the connection point interface of the determined connection point object. The sink object then requests to be connected to the connection point object using the returned connection point interface pointer and passes a reference to a notification interface of the sink object corresponding to the particular interface. The connection point object then stores the reference to the notification interface of the sink object, creating a connection between the sink object and the source object. At some later time, the source object can utilize the connection to notify the sink object through the connected notification interfaces.

53 Claims, 10 Drawing Sheets

U.S. PATENT DOCUMENTS

| | | | | | |
|---|---|---|---|---|---|
| 5,307,490 | A | | 4/1994 | Davidson et al. | 709/328 |
| 5,315,703 | A | * | 5/1994 | Matheny et al. | 345/326 |
| 5,327,562 | A | * | 7/1994 | Adcock | 717/8 |
| 5,367,633 | A | * | 11/1994 | Matheny et al. | 345/339 |
| 5,371,891 | A | * | 12/1994 | Gray et al. | 717/5 |
| 5,410,705 | A | * | 4/1995 | Jones et al. | 717/5 |
| 5,485,617 | A | | 1/1996 | Stutz et al. | 395/700 |
| 5,517,645 | A | | 5/1996 | Stutz et al. | 395/700 |
| 5,539,909 | A | | 7/1996 | Tanaka et al. | |
| 5,574,918 | A | | 11/1996 | Hurley et al. | 712/220 |
| 5,794,038 | A | | 8/1998 | Stutz et al. | 395/683 |

OTHER PUBLICATIONS

Arnold J., et al., "Control Integration and its Role in Software Integration." Genie Logiciel & Systemes Experts. No. 30, pp. 14–24, Mar. 1993. France.

Lau C., "Using SOM for Tool Integration," Proceedings of Cascon '93, Toronto, Ont., Canada, Oct. 24–28, 1993, Nat. Res. Council of Canada, Canada, pp. 570–580, vol. 1.

Aschmann H.–R et al., "Alphorn: a Remote Procedure Call Environment for Fault–Tolerant, Heterogeneous, Distributed Systems," IEEE Micro, Oct. 1991, USA, vol. 11, No. 5, ISSN 0272–1732, pp. 16–19, 60–67.

Lea R., et al., "COOL: System Support for Distributed Programming," Communications of the ACM, Sep. 1993, USA, vol. 36, No. 9, ISSN 0001–0782, pp. 37–46.

Kiriha, et al., "Integrated Network Management System in Distributed Environment," Technical Report of the Institute of Electronics, Information and Communication Engineers. vol. 92, No. 317(IN92–87), pp. 25–30, Nov. 1992.

Kanai and Sirakihara, "Highly Reliable Distributed Processing Environment on Workstations Through Hierarchical Transaction Scheme," Transactions of Information Processing Society of Japan. vol. 33, No. 11(Nov. 1992), pp. 1384–1393.

Kimura and Ueno, "The Advent of Distributed Processing Environment for Open Era, Jump to Object Oriented for the Starting of Cooperation Through the Progressively Developed RPC Base," Nikkei Computer Dec. 16, 1991, No. 270, pp. 81–93.

Wong, W., "Object–Oriented Program Construction," Dr. Dobb's Journal, Oct. 1992, pp. 36, 38, 40, 42, 116, and 118.

"Object Oriented Technology innovating line OpS: Pass the system development to the hands of users", *NTT Technical Journal*., vol. 5, No. 7, pp. 25–28, Jul. 1, 1993.

* cited by examiner

METHOD AND SYSTEM FOR DYNAMICALLY GENERATING OBJECT CONNECTIONS

Matter enclosed in heavy brackets [ ] appears in the original patent but forms no part of this reissue specification; matter printed in italics indicates the additions made by reissue.

TECHNICAL FIELD

The present invention relates generally to a computer system for connecting objects and, more specifically, to a method and system for generating object connections for notification purposes.

BACKGROUND OF THE INVENTION

Often times software is created that needs to communicate with other software when certain events occur. For example, in a computer windowing system, when a user selects a window on the display, the window system needs to notify the software that is drawing information in the window that the window bas been selected. In prior systems, the software needing notification of certain events registers the events for which it wants to be notified with the software that raises the events. In come prior systems, as part of the registration mechanism, the software needing notification registers a notification function by which it can be notified. Then, when the software raises an event that was previously registered, the registered notification function is called. This is known in the prior art as a callback mechanism.

An overview of well-known object-oriented programming techniques is provided, since the present invention is described below using object-oriented concepts. Two common characteristics of object-oriented programming languages are support for data encapsulation and data type inheritance. Data encapsulation refers to the binding of functions and data. Inheritance refers to the ability to declare a data type in terms of other data types.

In the C++ language, object-oriented techniques are supported through the use of classes. A class is a user-defined type. A class declaration describes the data members and function members of the class. For example, the following declaration defines data members and a function member of a class named CIRCLE.

```
class CIRCLE
{public;
   int x, y;
   int radius;
   void draw( );
};
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. A function member is also referred to as a method of a class. The data members and function members of a class are bound together in that the function operates on an instance of the class. An instance of a class is also called an object of the class.

In the syntax of C++, the following statement declares the objects a and b to be of type class CIRCLE.

```
CIRCLE a, b;
```

This declaration causes the allocation of memory for the objects a and b. The following statements snip data to the data members of objects a and b.

```
a.x=2;
a.y=2;
a.radius=1:
b.x=4;
b.y=5;
b.radius=2;
```

The following statements are used to draw the circles defined by objects a and b.

```
a.draw( );
b.draw( );
```

A derived class is a class that inherits the characteristics—data members and function members—of its base classes. For example, the following derived class CIRCLE_FILL inherits the characteristics of the base class CIRCLE.

```
class CIRCLE_FILL: CIRCLE
{public;
   int pattern;
   void fill( );
};
```

This declaration specifies that class CIRCLE_FILL includes all the data and function members that are in class CIRCLE in addition to those data and function members introduced in the declaration of class CIRCLE_FILL that is, data member pattern and function member fill. In this example, class CIRCLE_FILL has data members x, y, radius, and pattern and function members draw and fill. Class CIRCLE_FILL is said to "inherit" the characteristics of class CIRCLE. A class that inherits the characteristics of another class is a derived class (e.g., CIRCLE_FILL). A class that does not inherit the characteristics of another class is a primary (root) class (e.g., CIRCLE). A class whose characteristics are inherited by another class is a base class (e.g., CIRCLE is a base class of CIRCLE_FILL). A derived class may inherit the characteristics of seventh classes, that is, a derived class may have several base classes. This is referred to as multiple inheritance.

A derived class may specify that a base class is to be inherited virtually. Virtual inheritance of a base class means that only one instance of the virtual base class exists in the derived class. For example, the following is an example of a derived class with two nonvirtual base classes.

```
class CIRCLE_1: CIRCLE { . . . };
class CIRCLE_2: CIRCLE { . . . };
class PATTERN: CIRCLE_1, CIRCLE_2{ . . . };
```

In this declaration class PATTERN inherits class CIRCLE twice nonvirtually through classes CIRCLE_1 and CIRCLE_2. There are two instances of class CIRCLE in class PATTERN.

The following is as example of a derived class with two virtual base classes.

```
class CIRCLE_1: virtual CIRCLE { . . . };
class CIRCLE_2: virtual CIRCLE { . . . };
class PATTERN: CIRCLE_1, CIRCLE_2{ . . . };
```

The derived class PATTERN inherits class CIRCLE twice virtually through classes CIRCLE_1 and CIRCLE_2. Since the class CIRCLE is virtually inherited twice, there is only one object of class CIRCLE is the derived class PATTERN. One skilled in the art would appreciate virtual inheritance can be very useful when the class derivation is more complex.

A class may also specify whether its function members are virtual. Declaring that a function member is virtual means that the function can be overridden by a function of the same name and type in a derived class. In the following example, the function draw is declared to be virtual in classes CIRCLE and CIRCLE_FILL.

```
class CIRCLE
{public;
   int x, y;
   int radius;
   virtual void draw( );
};
class CIRCLE_FILL: CIRCLE
{public;
   int pattern;
   virtual void draw( );
};
```

If a virtual function is declared without providing in implementation, then it is referred to as a pure virtual function. A pure virtual function to a virtual function declared with the pure specifier, "=Ø". If a class specifies a pure virtual function, then any desired class needs to specify an implementation for that function member before that function member may be invoiced.

In order to access objects, the C++ language provides a pointer data type. A pointer holds values that are addresses of objects in memory. Through a pointer, in object can be referenced. The following statement declares variable c_ptr to be a pointer on an object of type class CIRCLE and sets variable c_ptr to hold the address of object c.

CIRCLE *c_ptr,
c_ptr=&c;

Continuing with the example, the following statement declares object a to be of type class CIRCLE and object b to be of type class CIRCLE_FILL.

CIRCLE a:
CIRCLE_FILL b;

The following statement refers to the function draw as defined in class CIRCLE a. draw( );

Whereas, the following statement refers to the function draw defined in class CIRCLE_FILL.

b.draw( );

Moreover, the following statements type cast object b to an object of type class CIRCLE and invoke the function draw that is defined in class CIRCLE_FILL.

CIRCLE *c_ptr;
c_ptr=&b;
c_ptr->draw( ); // CIRCLE_FILL::draw( )

Thus, the virtual function that is called is function CIRCLE_FILL::draw.

FIG. 1 is a block diagram illustrating typical data structures used to represent an object. An object is composed of instance data (data member) and member functions, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains in entry for each virtual function member defined for the object. Each entry contains a reference to the code that implements the corresponding function member. The layout of this sample object confirms to the model defined in U.S. patent application Ser. No. 07/682,537, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that objects can be defined using other programming languages.

An advantage of using object-oriented techniques is that these techniques an be used to facilitate the sharing of objects. In particular, object-oriented techniques facilitate the creation of compound documents. A compound document is a document that contains objects generated by various computer programs. (Typically, only the data members of the object and the class type are stored in a compound document.) For example, a word processing document that contains a spreadsheet object generated by a spreadsheet program is a compound document. A word processing program allows a user to embed a spreadsheet object (e.g., a cell) within a word processing document. To allow this embedding, the word processing program is compiled using the class definition of the object to be embedded to access function members of the embedded object. Thus, the word processing program would need to be compiled using the class definition of each class of objects that can be embedded in a word processing document. To embed as object of a new class into a word processing document, the word processing program would need to be recompiled with the new class definition. Thus, only objects of classes selected by the developer of the word processing program can be embedded. Furthermore, new classes can only be supported with a now release of the word processing program.

To allow objects of an arbitrary class to be embedded into compound documents, interfaces are defined through which an object can be accessed without the need for the word processing program to have access to the class definitions at compile time. An abstract class is a class in which there is at least one virtual function member with no implementation (a pure virtual function member). An interface is an abstract class with no data members and whose virtual functions are all pure. Thus, an interface provides a protocol for two programs to communicate. Interfaces are typically used for derivation: a program implements classes that provide implementations for the interfaces the classes are derived from. Thereafter, objects are created as instances of these derived classes.

The following class definition is in example definition of in interface. In this example, for simplicity of explanation, rather than allowing any class of object to be embedded in its documents, a word processing program allows spreadsheet objects to be embedded. Any spreadsheet object that provides this interface can be embedded, regardless of how the object is implemented. Moreover, any spreadsheet object, whether implemented before or after the word processing program is compiled, can be embedded.

```
class      ISpreadSheet
{          virtual void File( ) = 0;
           virtual void Edit( ) = 0;
           virtual void Formula( ) = 0;
           virutal void Format( ) = 0;
           virtual void GetCell (string RC, cell *pCell) = 0;
           virtual void Data( ) = 0;
}
```

The developer of a spreadsheet program would need to provide an implementation of the interface to allow the spreadsheet objects to be embedded to a word processing document.

When the word processing program embeds a spreadsheet object, the program needs access to the code that implements the interface for the spreadsheet object. To access the class code, each implementation is given a unique class identifier. For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each class identifier to the code that implements the class. Typically, when a spreadsheet program is installed on a computer system, the persistent registry is updated to reflect the availability of that class of spreadsheet objects. So long as a spreadsheet developer implements each function member defined by the interface and the persistent registry is maintained, the word processing program can embed instances of the developer's spreadsheet objects into a wood processing document. The word processing program accesses the functional members of the embedded spreadsheet objects without regard to who has implemented them or how they have been implemented.

Various spreadsheet developers may wish, however, to implement only certain function members. For example, a spreadsheet developer may not want to implement database support, but may want to support all other function members. To allow a spreadsheet developer to support only some of the function members, while still allowing the objects to be embedded, multiple interfaces for spreadsheet objects are defined. For example, the, interfaces IDatabase and IBasic may be defined for a spreadsheet object as follows.

```
class     IBasic
{         virtual void File( ) = 0;
          virtual void Edit( ) = 0;
          virtual void Formula( ) = 0;
          virtual void Format( ) = 0;
          virtual void GetCell (string RC, cell *pCell) = 0;
}
class     IDatabase
{         virtual void Data( ) = 0;
}
```

Each spreadsheet developer would implement the IBasic interface and, optionally, the IDatabase interface.

At run time, the word processing program would need to determine whether a spreadsheet object to be embedded supports the IDatabase interface. To make this determination, another interface is defined (that every spreadsheet object implements) with a function member that indicates which interfaces are implemented for the object. This interface is named IUnknown (and referred to as the unknown interface or the object management interface) and is defined as follows.

```
class IUnknown
{ virtual HRESULT QueryInterface (REFIID iid, void
**ppv) = 0;
  virtual ULONG AddRef( ) = 0;
  virtual ULONG Release ( ) = 0;
}
```

The IUnknown interface defines the function member (method) QueryInterface. The method QueryInterface is passed in interface identifier (e.g., "IDatabase") in parameter iid (of type REFIID) and returns a pointer to the implementation of the identified interface for the object for which the method is invoked is parameter ppv. If the object does not support the interface, then the method returns a false. The type HRESULT indicates a predefined status, and the type ULONG indicates an unsigned long integer.

Code TABLE 1

```
HRESULT XX::QueryInterface(REFIID iid, void **ppv)
{   ret = TRUE;
  switch (iid) {
    case IID_IBasic;
      *ppv = *pIBasic;
      break;
    case IID_IDatabase;
      *ppv = *pIDatabase;
      break;
    case IID_IUnknown;
      *ppv = this;
      break;
    default;
      ret = FALSE;
  }
  if (ret == TRUE) {AddRef( ););
  return ret;
}
```

Code Table 1 contains pseudocode for C++ source code for a typical implementation of the method QueryInterface for class XX, which inherits the class IUnknown. If the spreadsheet object supports the IDatabase interface, then the method QueryInterface includes the appropriate case label within the twitch statement The variables plBasic and plDmabase point to a points to the virtual function tables of the IBasic end IDatabase interfaces, respectively. The method QueryInterface invokes to method AddRef (described below) to increment a reference count for the object of class XX when a pointer to an interface is returned.

Code Table 2

```
void XX::AddRef( ) {refcount++};
void XX::Release( ) {if (—refcount=0) delete this;}
```

The interface IUnknown also defines the methods AddRef and Release, which are used to implement reference counting. Whenever a new reference to an interface is created, the method AddRef is invoked to increment a reference count of the object. Whenever a reference is no longer needed, the method Release is invoked to decrement the reference count of the object and, when the reference count goes to zero, to deallocate the object. Code Table 2 contains pseudocode for C++ source code for a typical implementation of the methods AddRef and Release for class XX, which inherits the class IUnknown.

The IDatabase interface and IBasic interface inherit the IUnknown interface. The following definitions illustrate the use of the IUnknown interface.

```
class IDatabase: public IUnknown
{ public;
    virtual void Data( ) = 0;
}
class IBasic: public IUnknown
{ public;
  virtual void File( ) = 0;
  virtual void Edit( ) = 0;
  virtual void Formula( ) = 0;
  virtual void Format( ) = 0;
  virtual void GetCell (string RC, cell *pCell) = 0;
}
```

The following pseudocode illustrates how a word processing program uses an IUnknown interface to determine whether a spreadsheet object supports the IDatabase interface.

```
if (pSpreadsheet->QueryInterface("IDatabase", &
  plDatabase))
// IDatabase supported
else
//IDatabase not supported
```

The pointer pSpreadsheet is a pointer to an instance of a spreadsheet class. As discussed above, the spreadsheet object may include some interfaces and not others. If the object supports the IDatabase interface, the method QueryInterface sets the pointer plDatabase to point to a IDatabase data structure and returns true as its value.

FIG. 2 is a symbolic representation of a spreadsheet object. In the following, an object data structure is represented by the shape 201 labeled with the interfaces through which the object may be accessed.

SUMMARY OF THE INVENTION

It is an object of the present invention to provide a method and system for dynamically generating object connections.

It is another object of the present invention to provide a method and system for connecting an arbitrary interface for subsequent notification purposes.

It is another object of the present invention to provide multiple points of connection connecting with multiple notification routines.

It is another object of the present invention to provide a mechanism for determining whether an object has a particular interface for connecting.

Is another object of the present invention to provide a method and system for invoking previously connected notification routines without any knowledge of what tasks they perform.

It is another object of the present invention to provide a method and system for event handling using application independent object interfaces.

These and other objects, which will become apparent as the invention is more fully described below, are obtained by an improved method and system for dynamically generating object connections. In a preferred embodiment, the present invention comprises a source object and a sink object. The source object contains one or more connection point objects, each of which contains a connection point interface for connecting to sink objects. Each sink object bas a notification interface for communicating to the sink object. To establish a connection, the source object determines which connection point object to use for a particular connection request. Using this determined connection point object, the sink object requests to be connected to the source object passing an indication of a notification interface to be used for further communication. The source object then stores the indicated notification interface in a data structure managed by the, connection point object. Later, the source object determines what notification interfaces have been stored in a particular connection point object and invokes a particular method of each stored notification interface to notify each sink object that has connected a notification interface. Such notification typically occurs in response to an event, for example, movement from a user input device.

DETAILED DESCRIPTION OF THE INVENTION

Figure 1:
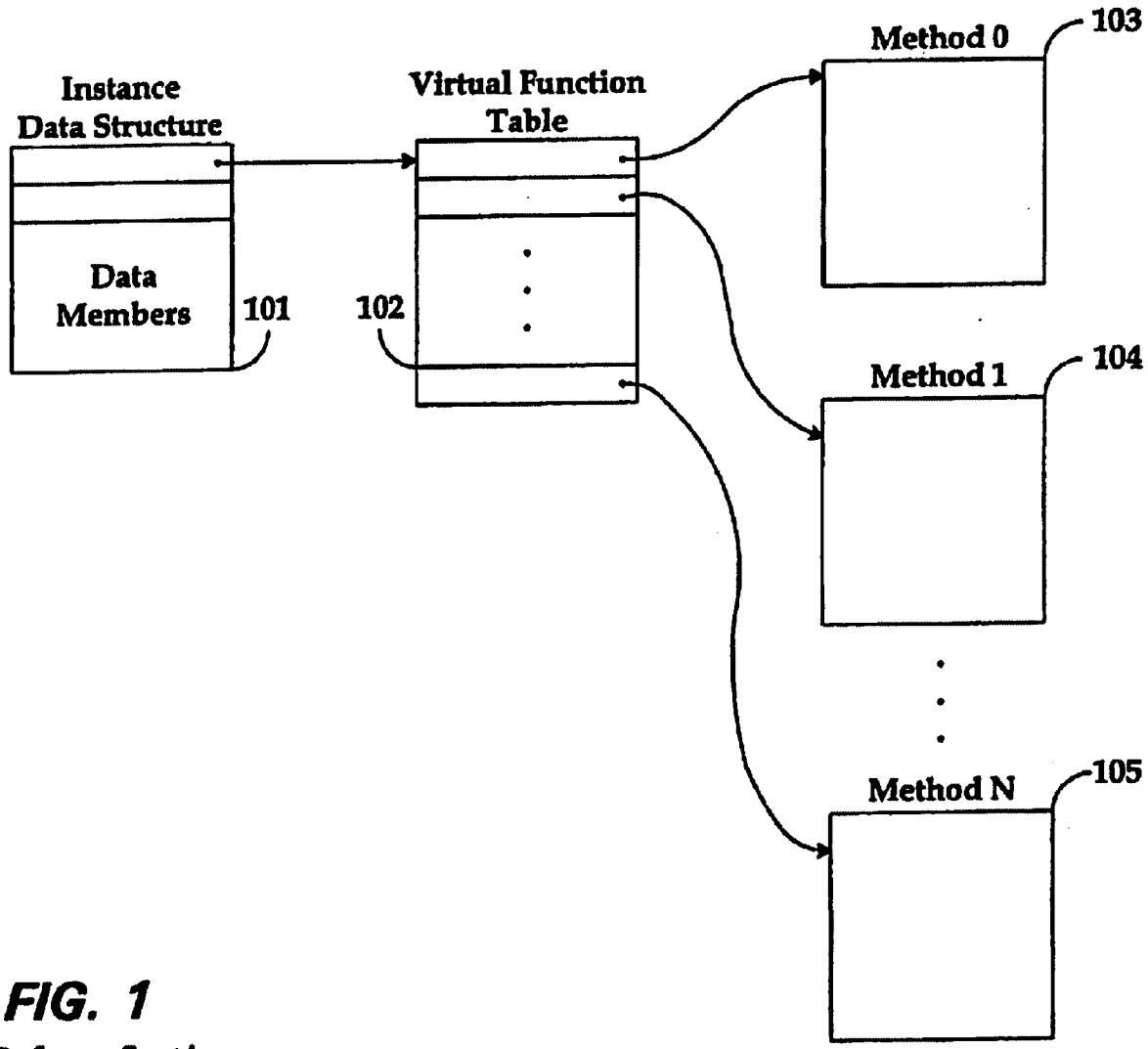
FIG. 1 (Prior Art)
FIG. 1 is a block diagram illustrating typical data structures used to represent an object
Figure 2:
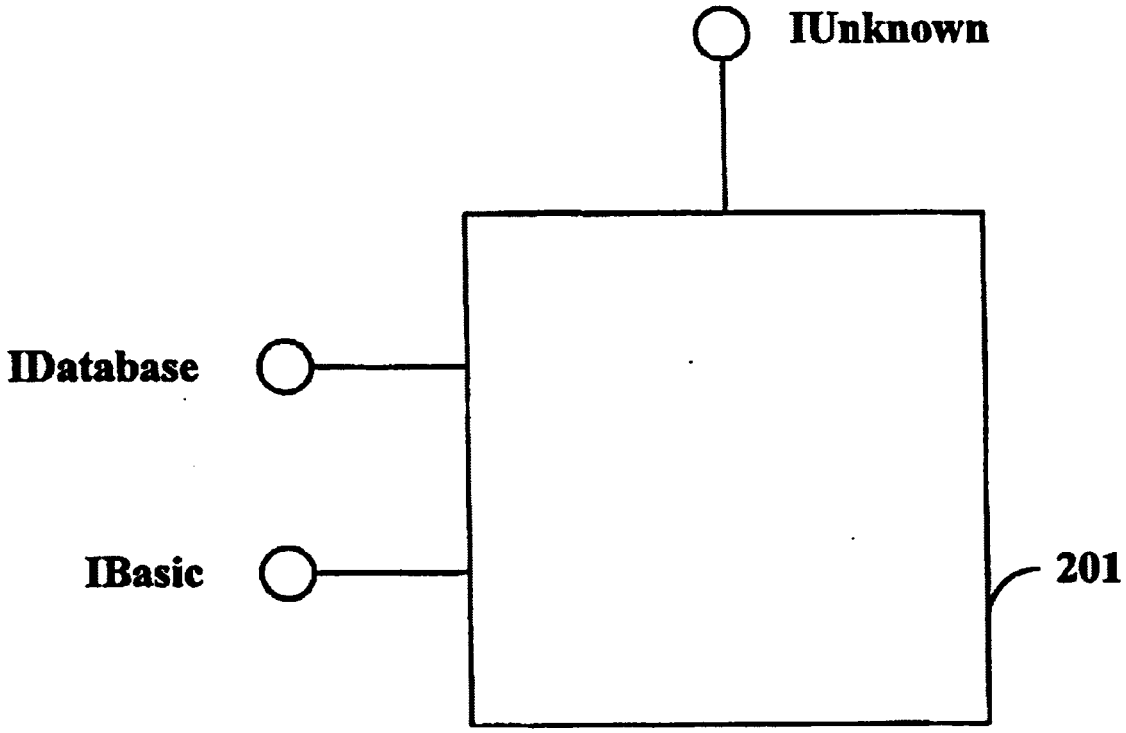
FIG. 2 is a symbolic representation of a spreadsheet object.

The preheat invention provides a method and system for generating object connections between source objects and sink objects. These connections can be used to support multiple types of event handling mechanisms for objects; the invention provides an underlying connection mechanism architecture for object communication. A source object refers to an object that raises or recognizes an event, and a sink object refers to an object that handles the event. A connection between a source and sink object may be directly initiated by either object or by a third object, referred to as an initiator object. In a typical event handling environment, the source object raises or recognizes an event and notifies the sink object or initiator object by invoking a notification method. If the notification method belongs to the initiator object, then the initiator object is responsible for invoking an appropriate method of the sink object to handle the event.

In a preferred embodiment, the methods and systems of the present invention are implemented on a computer system comprising a central processing unit, memory, and input/output devices. In a preferred embodiment of the present invention, a source object comprises connection point objects end a connection point container object for managing the connection point objects. Preferably, the connection point container object is implemented as part of the route object and the connection point objects are implemented as subobjects of the source object. The subobjects isolate the application independent behavior of the present invention. The connection point container object provides an interface comprising a method that an enumerate the contained connection point objects and a method that can find a connection point object corresponding to a particular interface identifier ("ID"). A connection point object is associated with a certain type of interface (identified by an interface ID) through which it notifies sink objects to which it is connected. A connection point object preferably provides an interface that comprises methods for connecting a notification interface, for disconnecting a previously connected notification interface, and for enumerating the connected notification interfaces. A connection point object preferably can optionally store references to multiple notification interfaces (belonging to one or more sink objects). A connected notification interface acts as an event set. That is, by virtue of the definition of as interface, each object supporting a documented interface must provide is certain set of methods. Thus, when a sink object connects a notification interface, the source object automatically knows what methods are supported by the notification interface. From this perspective, the methods supported loosely correspond to events, and the entire notification interface loosely corresponds to a set of events.

Once connected, the source object an use the connection point objects in a variety of manners. In typical operation, the source object, upon receiving an event notification, consults the connection point object(s) that is (are) associated with the interface ED corresponding to the received event to obtain the connected notification interfaces. The source object then forwards the event notification to each connected notification interface by invoking a predetermined method of the notification interface. In this manner, several sink objects can be notified upon the occurrence of a single event.

Figure 3:
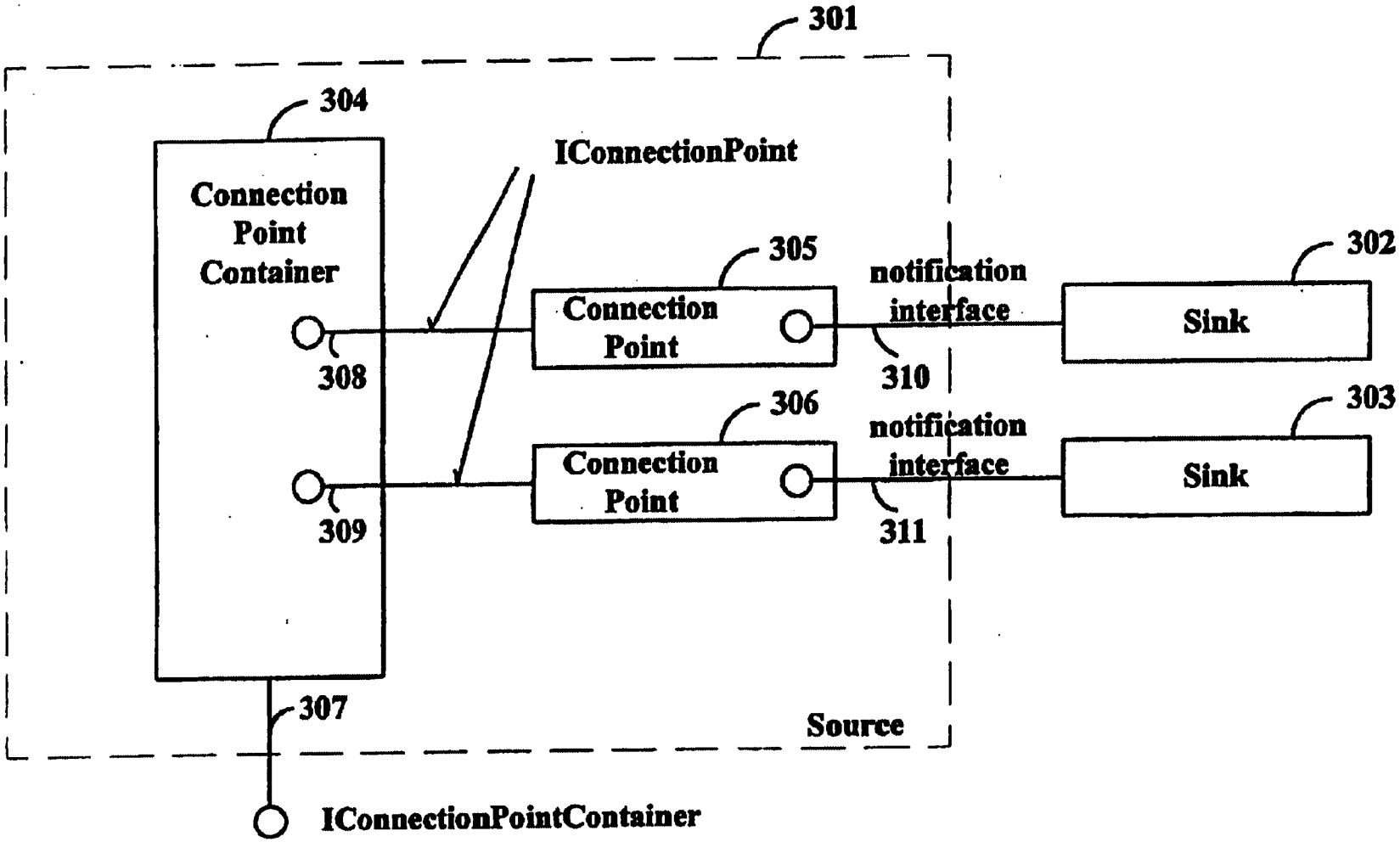
FIG. 3 is a block diagram of a preferred connection mechanism architecture.

FIG. 3 is a block diagram of a preferred connection mechanism architecture This figure shows a source object 301 connected to two sink objects 302 and 303 through two connection point objects 305 and 306. The source object 301 implements a connection point container object 304 for managing the connection point objects 305 and 306. The connection point container object 304 implements an IConnectionPointContainer interface 307 for enumerating and finding connection point objects. The connection point objects 305 and 306 are accessed by the connection point container object 304 through their respective IConnection-Point interfaces, 308 and 309. The connection point objects 305 and 306 art connected to the sink objects 302 and 303 through their respective notification interfaces 310 and 311. The source object 301 notifies the sink objects 302 and 303 of the occurrence of an event by locating the IConnection-Point interface corresponding to the event and invoking a method of the notification interface of the sink object.

As mentioned above, a connection between a source and sink object can be initiated by an initiator object. The initiator object can either connect a notification interface of the sink object to the source object or can connect a notification interface of its own "delegate" object A delegate object is simply in object that resides between the sink object and the source object. The delegate object is transparent to both the source and sink object because it provides an implementation for the interface corresponding to the connection point object, just as the sink object provides. The delegate object is responsible for forwarding any event notifications to the sink object In this manner, the delegate object can be used as a security mechanism, deciding whether or not to forward an event notification based upon the comparative authorization privileges of the source and sink objects.

Figure 4:
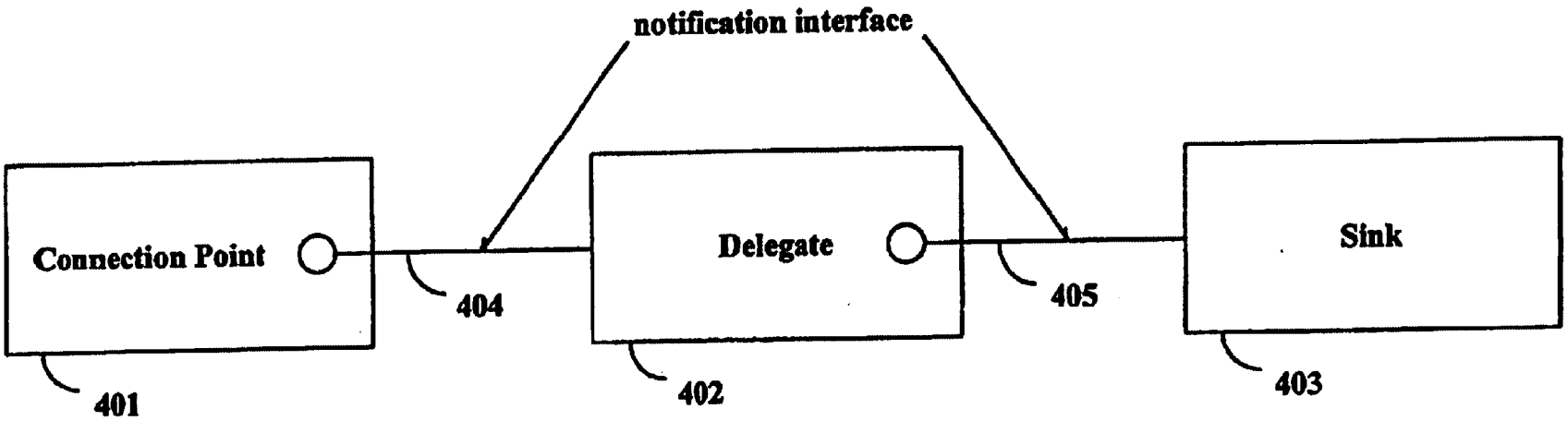
FIG. 4 is a block diagram of a connection between a source object, a delegate object and a sink object.

FIG. 4 is a block diagram of a connection between a source object, a delegate object, and a sink object. The connection illustrated in FIG. 4 comprises three objects: a connection point object 401, a delegate object 402, and a emit object 403. The delegate object 402 is connected to the connection point object 401 through a particular notification interface 404. This same notification interface is used to connect the sink object 403 to the delegate object 402. Thus, the two notification interfaces 404 and 405 are different implementations of the, same interface definition and thus have the same interface ID.

Figure 5:
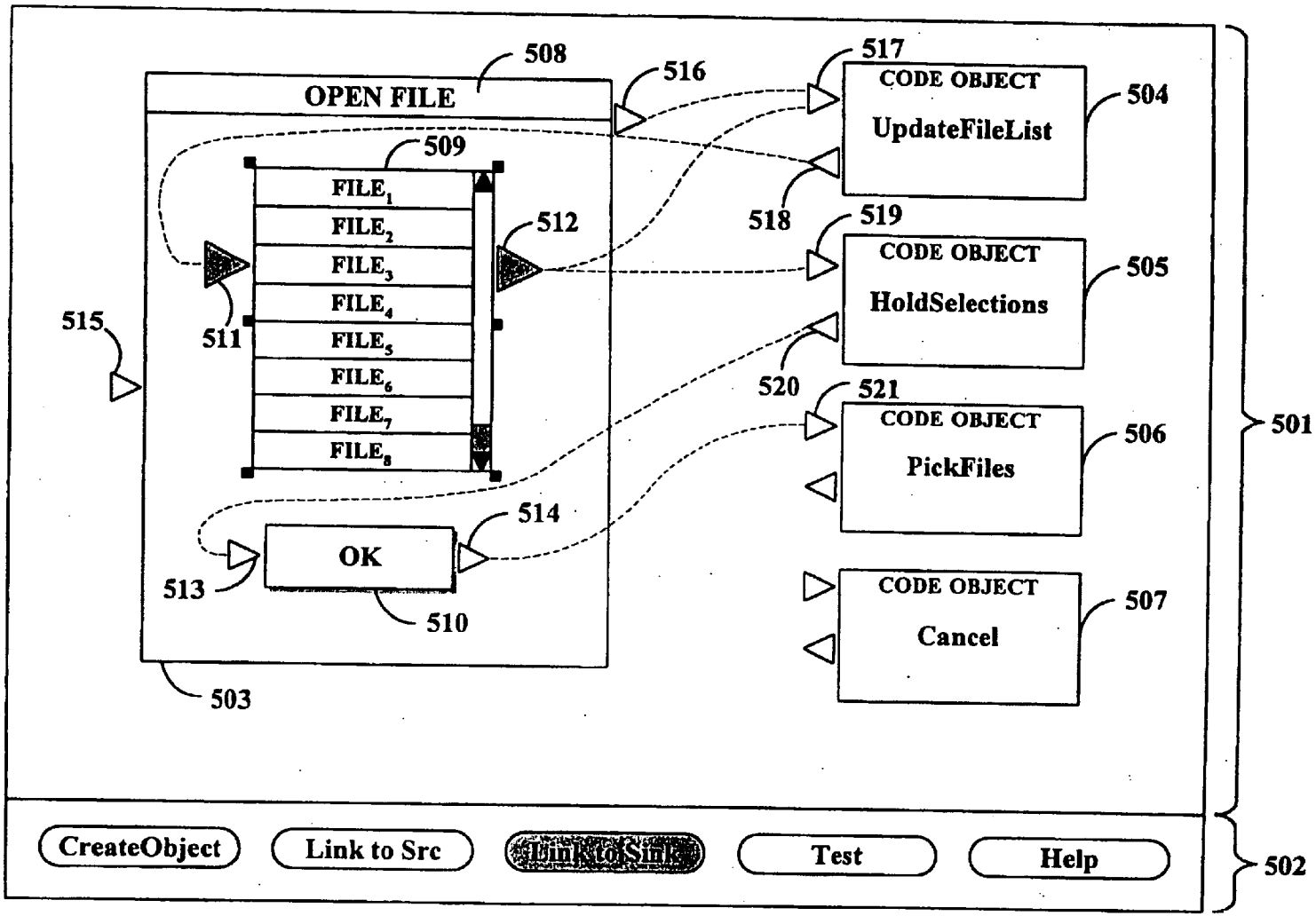
FIG. 5 is a block diagram of a visual programming environment display used to create an open file dialog box for an application program.

A typical application of the present invention involves connecting objects in a visual programming environment. Visual programming is a computer programming technique that allows for rapid development of visually oriented programs (visual programs). A visual programming environment typically includes a list of predefined components (objects) that can be interconnected to sink a visual program. Each component may include input and output ports and a visual interface. When creating a visual program, a visual programmer specifies the visual components and their location on the display. The visual programmer also specifies the interconnection between various ports. The visual components then use these connections to communicate with each other For example, a dialog box for an application program can be stated using a visual programming environment. FIG. 5 is a block diagram of a visual programming environment display used to create an open file dialog box for an application program. An open file dialog box is used for scrolling through a list of file names to select files to open. The visual programming environment display comprises two parts: a workspace display area 501 and a command area 502. The workspace display area 501 shows multiple objects being created and connected to program a dialog box visually. The objects currently shown in the workspace display area 501 include an open file dialog box object 503 and four code objects 504–507. Each object in turn comprises several subobjects. For sample, the open file dialog box object 503 comprises a title bar object 508, a multiple selection list box object 509, and a button object 510. In the state shown, the multiple selection list box object 509 is currently selected by the user for creating connections with other objects. An input port 511 and an output port 512 corresponding to the selected object 509 are shown as highlighted objects. Using the various commands provided by the buttons in the command area 502, a visual programmer has connected the output port 516 of the open file dialog box object 503, the input and output ports 511 and 512 of the multiple selection list box object 509, and the input and output ports 513 and 514 of the button object 510 to code objects 504–506. Specifically, the output port 516 of the open file dialog box object 503 has been connected to the input port 517 of the code object 504, which contains code for updating the list of files shown in the multiple selection list box object 509. Also, the input port 511 of the multiple selection list box object 509 bas been connected to the output port 518 of the code object 504. Therefore, when a user selects the open file dialog box object 503, the list of files shown in multiple selection list box object 509 is updated to reflect additions a deletions of files since the dialog box was last selected. The output port 512 of the multiple selection list box object 509 has been connected to the input port 519 of the code object 505 which contains code for tracking the files selected in the multiple selection list box object 509. This output port has also been connected to the input port 517 of the code object 504 so that the file list displayed is the multiple selection list box is updated each time the user selects a file. The input port 513 of the button object 510 has been connected to the output port 520 of the code object 505 so that the list of selected files is passed to the button object 510 each time a file is selected. The output port 514 of the button object 510 has been connected to the input port 521 of the code object 505, which contains code that opens each file in the list of selected files once the user has pressed the OK button implemented by button object 510.

Once seated using this visual programming environment, the open file dialog box operates by responding to particular system events, for example, events raised from user input devices. For example, when the user selects the open file dialog box 500, a MouseLeftButtonDown selection event is sent to the open file dialog box object 503. Upon receiving this selection event, the open file dialog box object 503 forwards the notification to the code object 504, because the input port 511 of the code object 504 has been previously connected to the output port 516 of the open file dialog box object 503. The code object 504, which implements code for updating the list of displayed files, then sends an updated file list to the multiple selection list box object 509, because the output port 518 of the code object 504 has been previously connected to the input port 511 of the multiple selection list box object 509. Also, when a user selects a file in the list box implemented by the multiple selection list box object 509 using a mouse input device, a MouseLeftButtonDown selection event is sent to the multiple selection list box object 509. This event is then forwarded to the code object 505 to keep track of the user selection because the input port 519 of the code object 505 has been previously connected to the output port 512 of the multiple selection list box object 509. The code object 505 then sends a list of selected files to the button object 510, because the output port 520 of the code object 505 has been previously connected to the input port 513 of the button object 510. In addition, when a user selects the OK button implemented by the button object 510, a system selection event (for example, a MouseLeftButtonDown selection event is sent to the button object 510. The button object 510 then forwards its output (which in this case is the list of selected files) to the code object 506, because the output port 514 of the button object 510 has been previously connected to the input port 521 of the code object 506. Upon receiving the button selection event, the code object 506 opens the files selected by the user.

Figure 6:
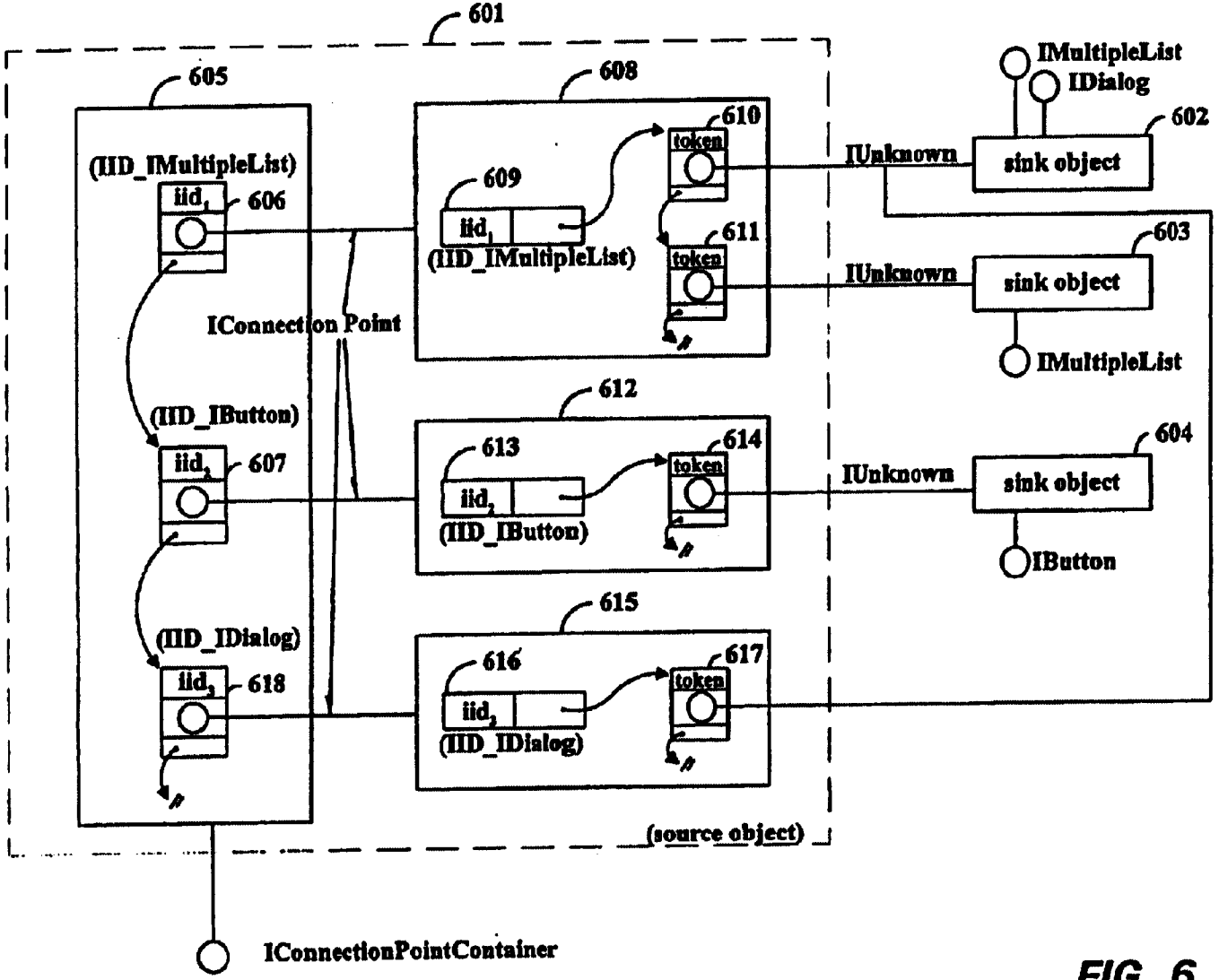
FIG. 6 is a block diagram of object connections and data structures after connecting the objects shown in FIG. 5 using the present invention.

In one example application, the present invention can be used to dynamically generate the object connections needed by the visual programming example Illustrated in FIG. 5. FIG. 6 is a block diagram of object connections and data structures after connecting the objects shown is FIG. 5 using the present invention. FIG. 6 shows four objects: a source object 601, which corresponds to the open file dialog box object 503 in FIG. 5 and three sink objects 602–601, which correspond to the code objects 504–506 in FIG. 5. The source object 601, corresponding to the open file dialog box object 503, contains subobjects corresponding to the title bar object 508, the multiple selection list box object 509, and the button object 510. (None of the subobjects are shown.) Alternatively, using the present invention, one could create a source object for each of the subobjects contained in the open file dialog box object 503 and then connect each of the source objects with the appropriate code object (sink object).

Because the open file dialog box object 503 deals with system events corresponding to the selection of the open file dialog box object 503, the selection of files within the multiple selection list box object 509, and user selection of the OK button implemented by the button object 510, the source object 601 supports connection point objects associated with different event sets. Specifically, the source object 601 contains a connection point container object 605 and three connection point objects 608, 612, and 615. Connection point object 608 is associated with the IMultipleList interface used to support the multiple selection list box object 509. Connection point object 612 is associated with the IButton interface used to support the button object 510. Connection point object 613 is associated with the IDialog interface used to support the open file dialog box object 503. The connection point container object 605 provides the IConnectionPointContainer interface and maintains a list of pointers to connection point objects. In FIG. 6, the list of pointers to connection point objects currently has three elements 606, 607, and 618. Each element contains an indicator of the interface ID associated with the connection point object, a pointer to the IConnectionPoint interface of the connection point object, and a pointer to the next element of the list. One skilled in the art would realize that other data structures could be used to manage the set of created connection point objects. Also, more or less information could be associated with each list element for efficiency reasons. For example, each element need not store the interface ID, as the interface ID is readily accessible from the connection point object.

Each connection point object provides the IConnectionPoint interface and maintains a list of references to notification interfaces belonging to sink objects. A reference to a notification interface of a sink object is added to this list whenever the sink object requests a connection from a connection point object using the IConnectionPoint interface. The connection point object 608, which is referenced by the list element 606 in the connection point container object 605, currently shows a list of references to notification interfaces containing two elements 610 and 611. A header for the list of references to notification interface 609 is provided for quick access to the associated interface identifier and to the first list element. Each list element contains a token uniquely identifying the connection, a pointer to the IUnknown interface of the connected sink object, and a pointer to the next element in the list. For example, list element 610 contains a token uniquely identifying the connection with sink object 602, which corresponds to the code object 504 for updating the list of files displayed by the multiple selection list box object 509. List element 610 also contains a pointer to the IUnknown interface of sink object 602 is order to access the IMultipleList interface (the notification interface) of sink object 602. List element 610 also provides a pointer to list element 611. List element 611 analogously connects to sink object 603, which corresponds to code object 505 for keeping track of the selected files.

Connection point object 612 implements the connection between the button object 510 and the sink object 604, which corresponds to the code object 506 for opening files selected by the user. In an analogous manner to connection point object 608, connection point object 612 contains a list with one element 614. Element 614 contains a pointer to the IUnknown interface of sink object 604, which corresponds to code object 506. In addition, connection point object 615 is analogously connected to a notification interface of sink object 601 Note that the notification interface of sink object 602 that is connected to the connection point object 615 (IDialog) is different from the notification interface of the same sink object (MultipleList) that is connected to connection point object 609. However, in this embodiment, both connection point objects 608 and 615 contain a pointer to the IUnknown interface of sink object 602. As shown in FIG. 6, a connection point object can be connected to more than one notification interface (of one or more sink objects) and a sink object can be connected to out or more connection point objects.

Referring to FIG. 6, when the source object 601 receives the event associated with selecting the open file dialog box 503, the source object 601 will find the connection point object corresponding to the IDialog interface (615). The source object 601 will then notify the sink object 602, which updates the list of files using the Dialog interface of sink object 601 When the source object 601 receives a selection event associated with selecting the multiple selection list box object 509, the source object 601 will find the connection point object corresponding to the IMultipleList interface (608), and then will notify sink objects 602 and 603 using their connected notification interfaces (IMultipleList). Likewise, when the source object 601 receives a selection event associated with the user pressing the button object 510, the source object 601 will find the connection point object corresponding to the IButton interface (612), and then will notify sink object 604, using the connected notification interface (IButton). An example of the event notification corresponding to selecting the button object 510 is discussed with reference to FIG. 9.

Code TABLE 3

```
interface IConnection Point: public IUnknown {
  virtual HRESULT GetConnectionInterface (REFIID piid) = 0;
  virtual HRESULT GetConnectionPointContainer
    (IConnectionPointContainer **ppCPC) = 0;
  virtual HRESULT Advise (IUnknown *punk, DWORD *pdwToken) =
  0;
  virtual HRESULT Unadvise (DWORD dwToken) = 0;
  virtual HRESULT EnumConnection(IEnumConnections **ppEnum) =
  0;
  }
interface IEnumConnections: publicIUnknown {
  virtual HRESULT Next (ULONG eConnections, CONNECTDATA
    *rgpunk, ULONG *1peFetched) = 0;
  virtual HRESULT Skip (ULONG eConnections) = 0;
  virtual HRESULT Reset ( ) = 0;
  virtual HRESULT Clone (IEnumConnection **ppEnum) = 0;
  }
struct tagCONNECTDATA {
  IUnknown *punk;
  DWORD dwToken;
  } CONNECTDATA:
```

Code Table 2 contains C++ pseudocode for a preferred definition of the interfaces IConnectionPoint and IEnumConnections and the data structure returned by the enumerator interface IEnumConnections The IConnectionPoint interface contains methods for connecting and disconnecting to the connection point object and for enumerating the notification interfaces connected to the connection point object The method GetConnectionInteface returns a pointer to the interface ID associated with the connection point object. The method GetConnectionPalmContainer returns a pointer to the IConnectionPointContainer interface of the connection point container object containing the connection point object (its parent container object). When the connection point object is instantiated, the, creation method of the connection point object is passed a pointer to the connection point container object for future use. The method Advise connects the notification interface specified by the parameter punk to the connection point object and, if successful, returns a unique token identifying the connection in parameter pdwToken. The unique token may be stored persistently. The method Unadvise disconnects the notification interface specified by the input parameter dw/Token. The method EnumConnections returns an enumerator interface, an instance of the interface IEnumConnections, for iteration through the connected notification interfaces.

The Interface IEnumConnections implements the enumerator used by the IConnectionPoint interface. This enumerator contains a set of methods for enumerating the notification interface connections for a particular connection point object. The two methods of interest include the method Reset, which reinitializes the enumerator to point to the first connected notification interface, and the method Next, which returns a pointer to the next connected notification interlace. Code Table 3 shows a typical structure definition for the connection information returned by the enumerator method Next retorted to as CONNECTDATA.

Code TABLE 4

```
interface IConnection PointContainer: public IUnkown {
  virtual HRESULT EnumConnection Points (IEnumConnectionPoints
  **ppEnum) = 0;
  virtual HRESULT FindConnection Point (REFIID iid, iConnectionPoint
  **ppPoint) = 0;
}
interface IEnumConnectionPoints: public IUnknown {
  virtual HRESULT Next (ULONG eConnections, IConnection Point
  *rgpen,
    ULONG *1peFetched) = 0;
  virtual HRESULT Skip (ULONG eConnections) = 0;
  virtual HRESULT Close (IEnumEmbeddedConnection **ppcen) = 0;
  }
```

Code Table 4 contains C++ pseudocode for preferred definitions of the interfaces IConnectionPointContainer and IEnumConnectionPoints. The IConnectionPointContainer interface implements methods for finding a particular connection point object and for enumerating the set of contained connection point objects. The IEnumConnectionPoints interface implements the enumerator method used by the IConnectionPointContainer interface. The IConnectionPointContainer interface contains a method FindConnectionPoint which returns a pointer to an IConnectionPoint interface given a specified interface ID. The method EnumConnectionPoints returns a pointer to the interface IEnumConnectionPoints for iteration through the combined set of connection point objects. The interface IEnumConnectionPoints contains a method Reset for initializing the enumerator to point to the list connection object and a method Next for retrieving a pointer to the IConnectionPoint interface associated with the next connection point object stored in the connection point container object.

Figure 7:
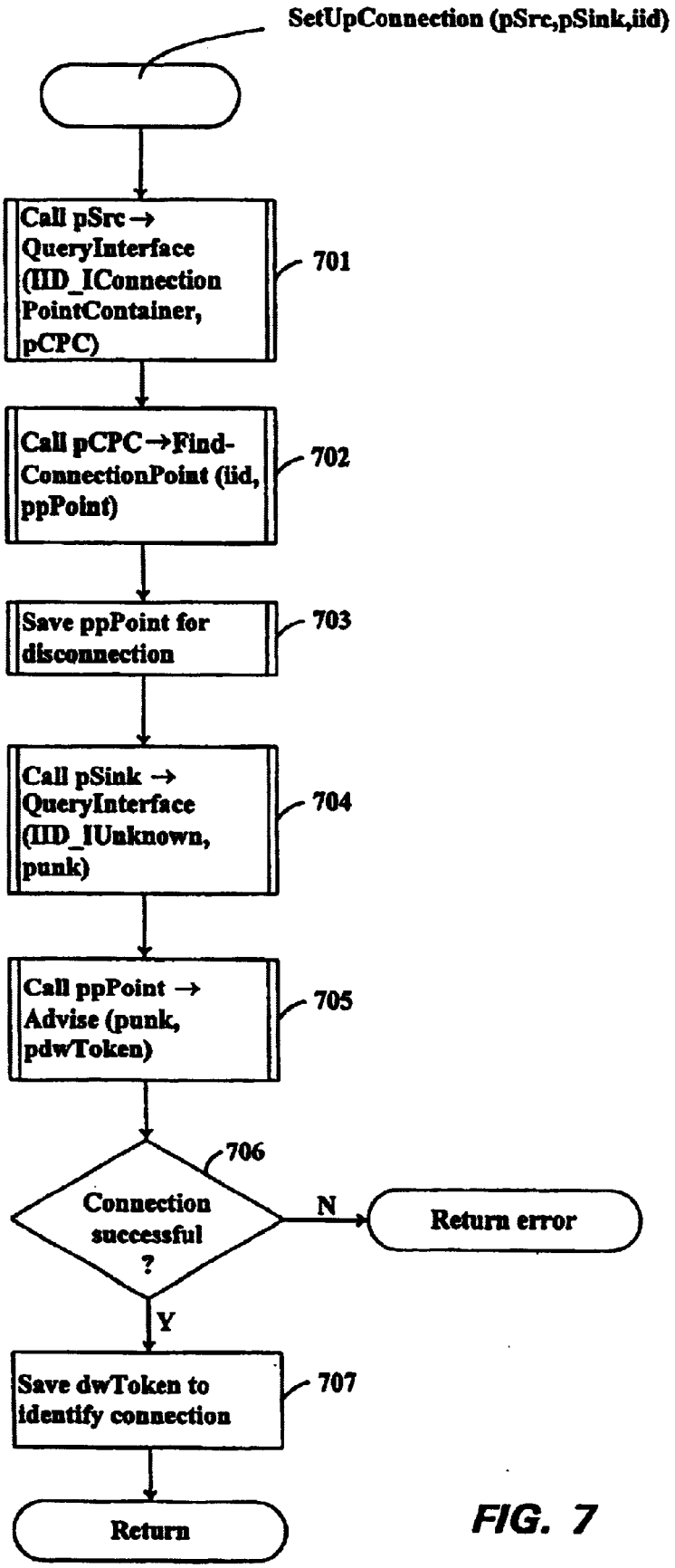
FIG. 7 is a flow diagram of a function SetUpConnection for connecting a specified sink object to a specified source object for a specified notification interface.

Corresponding to the example discussed with reference to FIGS. 5 and 6, as object comprising the visual programming environment depicted in FIG. 5 acts as an initiator object to set up connection between the open file dialog box object 503 (the source object) and the code objects (sink objects) 504, 505, and 506. FIG. 7 is a flow diagram of a function SetUpConnection for connecting a specified sink object to a specified source object for a specified notification interface. The initiator object (the code implementing the visual programming environment) could use this function to set up all of the connections shown in FIGS. 5 and 6. The function SetUpConnection provides one example of using the interfaces shown in Code Tables 3 and 4 to set up an event handling scheme. One skilled in the art would recognize the many uses of these interfaces and different functions than SetUpConnection are possible.

The function SetUpConnection determines the connection point object on the source object for connecting and connects the appropriate notification interface of the sink object to the connection point object. The function takes three input parameters: pSrc, which is a pointer to some interface of the source object to connect; pSink, which is a pointer to some interface of the sink object to connect; and iid, which is the interface identifier associated with the connection point object to which the sink object desires to connect. In step 701, the function calls the method QueryInterface of the specified source object to locate the IConnectionPointContainer interface of the specified source object. In step 702, the function uses the retuned IConnectionPointContainer interface pointer to invoke the method FindConnectionPoint to retrieve a pointer to the connection point object for the specified iid. (This function is discussed further with reference to FIG. 8.) In step 703, the function saves the returned pointer to the connection point object for use at some future time, for example, for disconnecting the sink object. In step 704, the function calls the method QueryInterface of the specified sink object to obtain a pointer to the IUnknown interface of the sink object. In step 705, the function calls the method Advise of the connection point object (returned in step 702) to connect the IUnknown interface of the sink object to the connection point object. The function passes the pointer to the IUnknow interface of the sink object in the call to Advise, and if successful, the method Advise returns the token uniquely identifying the connected notification interface. In step 706, if the connection was successfully performed by the method Advise, the function continues in step 707, else returns an error: In step 707, the function saves the token returned by the method Advise for later use in disconnecting the notification interface of the sink object, and then returns.

Figure 8:
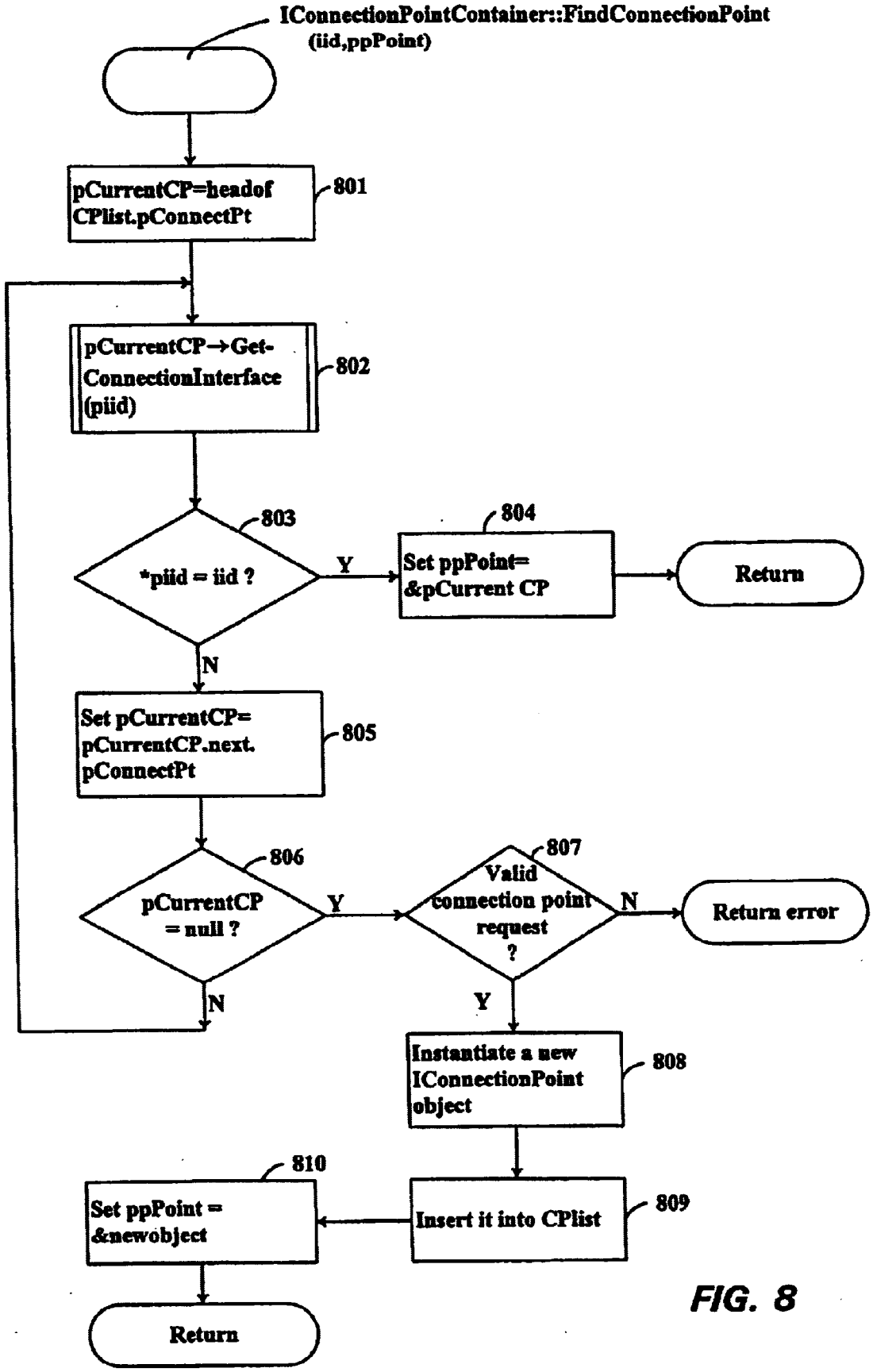
FIG. 8 is a flow diagram of the method FindConnectionPoint of the IConnectionPointContainer interface.

The function SetUpConnection incorporates one way of setting up connections between connection point objects and sink objects. One skilled in the art would realize that there are many alternatives. For example, an alternative to step 702 uses the enumerator method EnumConnectionPoints of the ConnectionPointContainer interface to determine the connection point object. Also, if a sink or initiator object already has a pointer to any connection point object in the source object, then the sink or initiator object can use the method GetConnectionPointContainer of the IConnectionPoint interface to retrieve a pointer to the connection point container object to search for a different connection point object. Also, if a sink or initiator object already has obtained the desired connection point object, then the sink or initiator object can call the method Advise directly, circumventing the preliminary steps. In addition, a preferred embodiment assumes that a pointer to the IUnknown interface of the specified sink object is tie interface pointer stored in the specified connection point object The IUnknown interface is used to support the persistent storage of connection point objects and enable delayed binding to a connected sink or delegate object. Alternatively, one could store a pointer to the notification Interface itself, without concern for delayed binding. Also, note that, in this function and those discussed below, reference counting has been omitted to simplify explanation. One skilled in the art would recognize that as object connections are created and destroyed, reference counts are preferably updated and that cyclical references are preferably avoided FIG. 8 is a flow diagram for the method FindConnectionPoint of the IConnectionPointContainer interface. This method returns a pointer to an IConnectionPoint interface of a connection point object corresponding to a specified interface identifier. The specified interface identifier is passed as an input parameter to the method, and the method returns a pointer to the interface pointer in an output parameter. In steps 801–806, the method loops through the list of instantiated connection point objects looking for the connection point object corresponding to the specified interface identifier. In steps 807–810, if a corresponding connection point object has not been found, then the method instantiates a new connection point object if the requested interface identifier is supported by the source object; otherwise, the method returns an error. In step 801, a temporary variable is set to point to the IConnectionPoint interface pointer contained in the first list element. In step 802, the method GetConnectionInterface of the interface pointed to by the temporary variable is invoked to determine whether the interface ID associated with the connection point object referenced by the temporary variable (the current connection point object) matches the specified interface ID. In step 803, if the returned interface ID matches the specified interface ID, then the method continues at step 804, else continues at step 805. In step 804, the method sets the output parameter to point to the address of the IConnectionPoint interface pointer referenced by the temporary variable, and returns. In step 805, the temporary variable (which points to the current connection point object) is set to point to the IConnectionPoint interface of the IConnection element in the list of instantiated connection point objects. In step 806, if the method has reached the end of the list, then the method continues at step 807, else the method returns to the beginning of the loop in step 801. In step 807, the method determines whether the specified interface ID corresponds to a connection interface that the source object supports, and if so, the method continues at step 808, else returns in error. In step 808, the method instantiates a new connection point object. In step 809, the method inserts the newly instantiated connection point object into the connection point container object's list of connection point objects. In step 810, the method sets the output parameter to point to the address of the newly instantiated connection point object, and returns.

The steps comprising the method FindConnectionPoint in FIG. 8 assume that connection point objects are instantiated dynamically as needed. One skilled in the art would recognize that connection point objects can be established dynamically or statically at the discretion of the source object implementation. For example, upon instantiation of the source object, a connection point object corresponding a each connection interface identifier supported by the source object could be instantiated with empty lists of references to notification interfaces. Also, certain steps could be eliminated for efficiency reasons from the method FindConnectionPoint if the connection point container object is implemented with knowledge of the connection point object implementation structure. Such knowledge might typically occur if the source object implementation provides its own implementations for the connection point container object and the connection point objects. In addition, the method FindConnectionPoint assumes that the data structure used to store references to the connection point objects is a list structure as shown In FIG. 6. This method could be alternatively written to handle various storage data structures.

Figure 9:
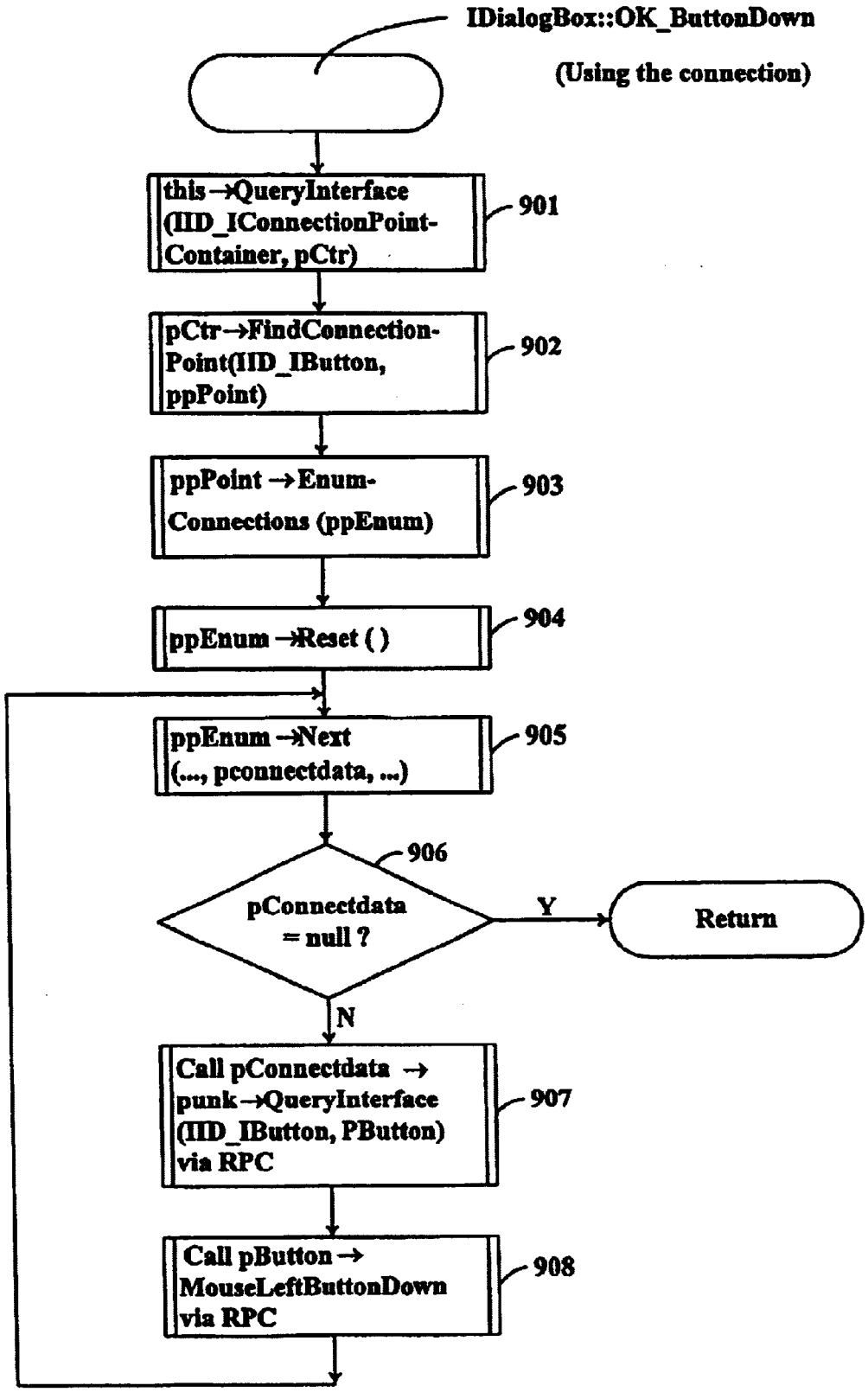
FIG. 9 is a flow diagram of a method that uses an established connection between a source object and a sink object.

FIG. 9 is a flow diagram of a method that uses an established connection between a source object and a sink object. Specifically, FIG. 9 illustrates a set of mops that could be performed by the source object corresponding to the open file dialog box object 503 in FIG. 5 when the source object receives a system selection event indicating that a user has depressed the OK button object 510. This example assumes the connections have been appropriately established as discussed with reference to FIG. 6. One skilled in the art would recognize that many other uses of and semantics for the object connection mechanism are possible.

When a user depresses the OK button object 510 in FIG. 5, the system sends a selection event to the source object. The source object then invokes some internal routine to respond to the externally raised event. FIG. 5 depicts an example of such a routine, which is he method OK_ButtonDown for the IDialogBox interface. The OK_ButtonDown method determines which connection point object corresponds to the interface identifier associated with the raised event and invokes a predetermined method of the notification interfaces connected to the determined connection point object. As described earlier, because the set of events that includes the raised event is represented by an interface, the source object has knowledge of what methods are supported by a connected sink object. Furthermore, in the source object routine handling the raised event (in this case, the OK-ButtonDown method), the source object can determine which particular method of the sink it prefers to invoke to handle the raised event. In this particular example, the method determines that the method MouseLeftButton-Down of the notification interface corresponding to the interface identifier IID_IButton is preferably invoked to respond to the raised selection event.

In step 901, the method obtains its own IConnectionPoint-Container interface using the method QueryInterface. In step 902, the method uses the IConnectionPointContainer interface pointer to invoke the method FindConnectionPoint requesting the connection point object that corresponds to the interface identifier IID_IButton. In step 903, the method invokes the method EnumConnections of the connection point object returned in the previous step to obtain an enumerator for enumerating the contents of the connection point object. In step 904, the method resets the enumerator to start at the beginning of the list of references to notification interfaces. In step 905, the method invokes the method Next of the enumerator to obtain the connection data for the next referenced notification Interface. In step 906, if the enumerator indicates no more references to notification interfaces are present, then the method returns, else the method continues in step 907. In step 907, the method calls the method QueryInteface of the IUnknown interface indicated in the connection point data structure requesting the notification interface corresponding to the interface Identifier IID_IButton, using a remote procedure call if necessary. A remote procedure call is necessary if the connected notification interface belongs to an object contained within another process address space. In step 908, the method invokes the method MouseLeftButtonDown of the retrieved IButton interface (wing a remote procedure call if necessary), and continues back to the beginning of the loop in step 905. One skilled in the art would recognize that multiple steps of this method could be eliminated for efficiency reasons if the implementations of the connection point container object and the connection point objects are known by the source object implementation.

Figure 10:
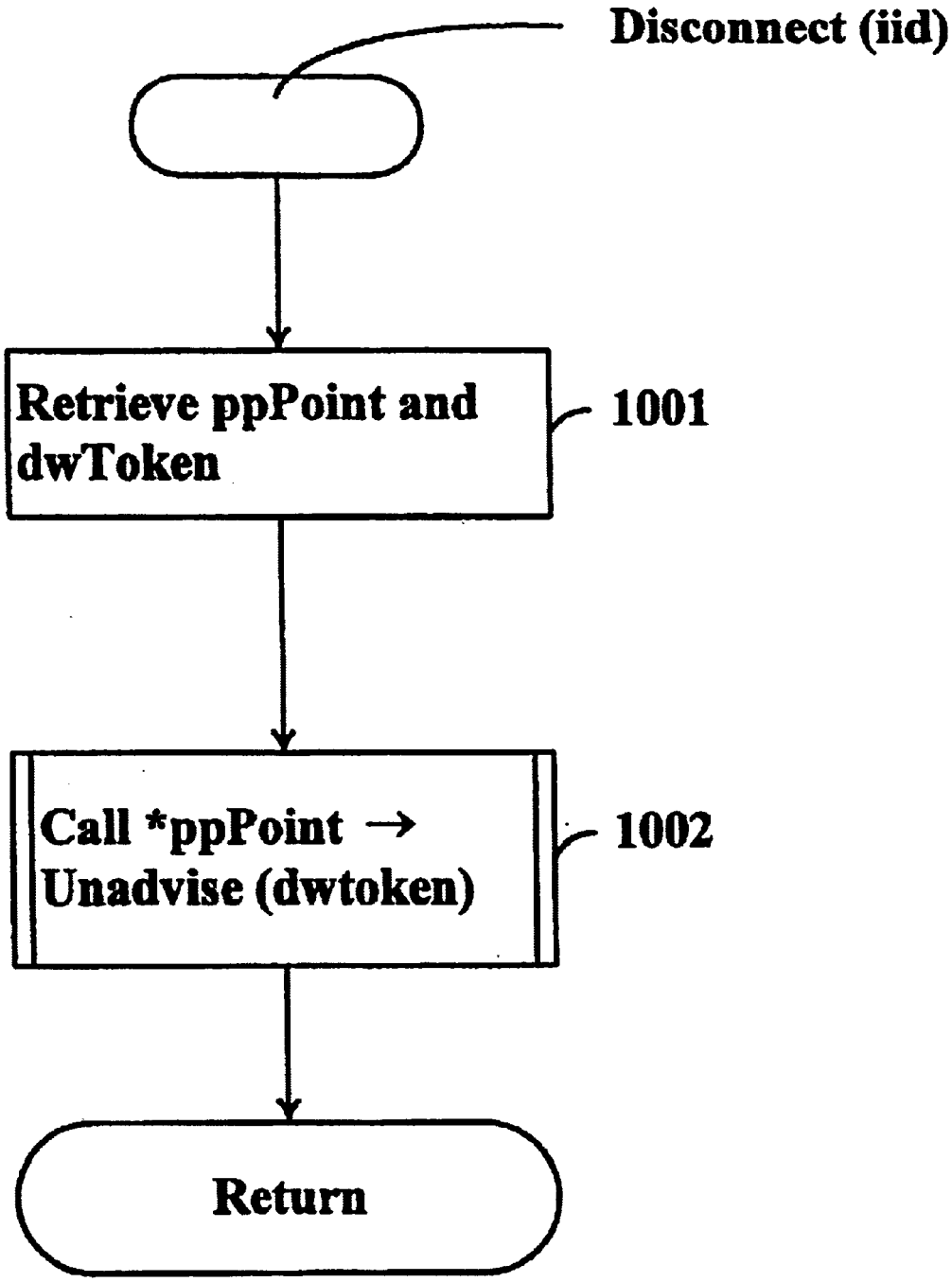
FIG. 10 is a flow diagram of a function defined by a sink object to disconnect a specified notification interface.

FIG. 10 is a flow diagram of a function defined by a sink object to disconnect a specified notification interface. The function has one input parameter, which is the interface ID of the notification interface the sink object desires to disconnect. In step 1001, the function retrieves the pointer to the IConnectionPoint interface of the connection point object for the specified interface ID, which was previously stored during the fraction SetUpConnection (see step 703 of FIG. 7). The function also retrieves the token uniquely identifying the connection previously established for the specified interface ID (see step 707 of FIG. 7). In step 1002, the function calls the method Unadvise of the retrieved IConnectionPoint Interface, passing it the retrieved token, and returns. The method Unadvise of the IConnectionPoint Interface uses the specified token to search through its list of references to notification interfaces to find the corresponding notification interface reference. The method Unadvise then removes the references to the corresponding notification interface from the list of connected notification interfaces, thus disconnecting the corresponding notification interface.

Code TABLE 5

```
Interface IProvideClass Info: public IUnknown {
    virtual HRESULT GetClassInfo (TT)peInfo **ppcl, CLID Icid) = 0;
    }
```

Code Table 5 Contains C++ pseudocode for a preferred definition of the interface IProvideClassInfo, which can used by a sink object to obtain information about an unknown source object. The Method GetClassInfo of the IProvide-ClassInfo interface can be used by a sink or initiator object to obtain class and type information from as unknown source object in order to connect to it. The ITypeInfo interface describes the interface implemented by the source object, what events its raises, and what properties it supports. A sink or initiator object can then use this information to set up compatible connections. The ITypeInfo interface is described is detail In U.S. patent application Ser. No. 07/959,056, entitled "Method tad System for Interfacing to a Type Library," which is hereby incorporated by reference.

Although the present invention has been described in terms of a preferred embodiment, it is not intended that the invention be limited to this embodiment modifications within the spirit of the invention will be apparent to those skilled in the art. The scope of the present invention is defined by the claims which follow.

We claim:

1. A method in a computer system for generating an object connection between a source object and a sink object, the sink object having an instance of an interface that serves as a notification interface for receiving communications from the source object, the notification interface having an associated interface identifier, the source object having instances of a connection point interface, the method comprising the steps of:

receiving a request having an indication of the interface identifier associated with the notification interface of the sink object;

selecting an instance of the connection point interface from among the instances of the connection point interface of the source object, wherein the selection of the instance is based upon the interface identifier indicated in the receive request;

sending a reference to the selected connection point interface instance;

receiving, through the selected connection point interface instance, a request to connect the source object and the sink object, the request having a reference to the notification interface instance of the sink object; and storing the reference to the notification interface instance, wherein the source object communicates with the sink object using the stored reference to the notification interface instance.

2. A method in a computer system for notifying a sink object from a source object, the sink object connected to the source object in accordance with the method of claim 1, including the step of, under control of the source object, invoking a member function of the notification interface instance referred to by the stored reference.

3. The method of claim l, the selected connection point interface instance for connecting to a plurality of sink objects, wherein the steps of receiving the request to connect and storing the reference to the notification interface instance are performed for each sink object, and further including the step of:

for each sink object, invoking a member function of the notification interface instance referred to by the stored reference.

4. The method of claim 1, the source object having a connection point container object for managing interaction with the instances of the connection point interface and wherein the step of selecting the instance of the connection point interface includes the substep of requesting the instance of the connection point interface from the connection point container object.

5. The method of claim 1, the connection point interface having an advise member function for requesting a connection to the source object, wherein the step of receiving the request to connect is performed by invoking the advise member function of the selected connection point interface instance.

6. The method of claim 1 wherein the step of selecting the instance of the connection point interface is performed under the control of code of the source object.

7. The method of claim 6 wherein the step of receiving the request to connect is performed under the control of code of the source object.

8. The method of claim 6, further comprising the step of, under the control of code of the sink object, requesting a connection.

9. The method of claim 1 wherein the step of storing the reference to the notification interface instance is performed under the control of code of the source object.

10. The method of claim 9, further comprising the step of, under the control of code of the sink object, requesting a connection.

11. The method of claim 1, further comprising the step of, under control of code of the sink object, requesting a connection.

12. The method of claim 1, the computer system having an initiator object for setting up connections between the source object and the sink object, further comprising the step of, under control of the initiator object, requesting a connection.

13. A method in a computer system for registering with a source object an instance of an interface that serves as a notification interface of a sink object, the source object having a registration function member for registering the notification interface of the sink object, the notification interface instance for communicating with the sink object from the source object, the sink object having a plurality of notification interfaces, each notification interface having at least one instance, the method including the steps of:

receiving a reference to the registration function member of the source object;

selecting the instance of the notification interface to be registered from the plurality of instances of notification interfaces; and requesting registration of the selected notification interface instance using the received reference to the registration function member of the source object, wherein the source object registers the selected notification interface instance and communicate with the sink object using the registered interface instance.

14. The method of claim 13, the source object having an advise member function for requesting registration of a notification interface, and wherein the step of requesting registration invokes the advise member function of the source object to make the request.

15. The method of claim 13, the sink object having an instance of an IUnknown interface for accessing other interfaces of the sink object, and wherein the step of selecting the instance of the notification interface selects the instance of the IUnknown interface of the sink object.

16. The method of claim 13 wherein the step of requesting registration is performed under the control of the sink object.

17. The method of claim 16 wherein the step of selecting the instance *of the* notification interface is performed under the control of the sink object.

18. The method of claim 13, the computer system having an initiator object for registering a notification interface of a sink object, wherein all steps are performed by the initiator object.

19. A method in a computer system for notifying a sink object from a source object using a delegate object, the sink object having a sink notification interface for notifying the sink object, the delegate object having a delegate notification interface for notifying the delegate object, the delegate notification interface having an associated interface identifier, the source object having instances of a connection point interface for connecting the delegate object, the method comprising the steps of:

storing, in the delegate object, a reference to an instance of the sink notification interface;

selecting an instance of the connection point interface from among the instances of the connection point interface of the source object, wherein the selection of the instance is based upon the interface identifier associated with the delegate notification interface;

sending, to the delegate object, a reference to the selected connection point interface instance;

receiving, through the selected connection point interface instance, a request to connect the source object and the delegate object, the request having a reference to an instance of the delegate notification interface;

storing the reference to the delegate notification interface instance;

invoking a method of the delegate notification interface instance that is referred to by the stored reference; and invoking a method of the sink notification interface instance referred to by the stored reference in the delegate object to effect the notification of the sink object.

20. The method of claim 19, the computer system having an initiator object for setting up connections between the source object and the delegate object, and further comprising the step of, under control of the initiator object, requesting a connection.

21. A method in a computer system for generating an object connection between a source object and a sink object, the sink object having a notification interface for communicating with the sink object, the notification interface having an associated interface identifier, the source object having a plurality of connection point objects for connecting the sink object, each connection point object having an instance of the same connection point interface, the method comprising the steps of:

sending, to the source object, an indication of the interface identifier associated with the notification interface of the sink object;

selecting a connection point object from among the plurality of connection point objects based upon the indication of the interface identifier;

requesting a connection, from the instance of the connection point interface of the selected connection point object, to connect the source object and the sink object;

indicating an instance of the notification interface of the sink object in the connection request;

receiving the connection request; and storing a reference to the indicated instance of the notification interface of the sink object.

22. The method of claim 21, further including the step of, under control of code of the source object, invoking a method of the indicated notification interface instance referred to by the stored reference.

23. The method of claim 21, the source object having connection point container object for managing interaction with the plurality of connection point objects and wherein the step of selecting the connection point object includes the substep of requesting the connection point object from the connection point container object.

24. The method of claim 21, the connection point interface having an advise member function, wherein the step of requesting the connection from the instance of the connection point interface of the selected connection point object invokes the advise member function of the instance of the connection point interface to make the request.

25. The method of claim 21, the selected connection point object for connecting to a plurality of sink objects, wherein the steps of requesting the connection, indicating the notification interface instance of the sink object, receiving the connection request, and storing the reference to the indicated notification interface instance are performed for each sink object, and further including the step of:

invoking a method of the indicated notification interface instance referred to by the stored reference for each sink object.

26. A method in a computer system for generating an object connection between a source object and a sink object, the sink object having an instance of a notification interface for receiving communications from the source object, the notification interface having an associated interface identifier, the source object having instances of a connection point interface, the method comprising the steps of:

under control of the sink object, sending to the source object a request having an indication of the interface identifier associated with the notification interface of the sink object;

under control of the source object, selecting an instance of the connection point interface from among the instances of the connection point interface of the source object, wherein the selection of the instance is based upon the interface identifier associated with notification interface of the sink object; and sending, to the sink object, a reference to the selected connection point interface instance;

under control of the sink object, requesting a connection from the selected connection point instance to connect the source object and the sink object, the request having a reference to the notification interface instance of the sink object; and under control of the source object, storing the reference to the notification interface instance.

27. A method in a computer system for generating an object connection between a source object and a sink object, the sink object implementing a plurality of notification interfaces for communicating with the sink object, each notification interface having an associated interface identifier, the source object having instances of a connection point interface, each instance of the connection point interface having an associated interface identifier, the method comprising the steps of:

selecting a notification interface [form] *from* among the plurality of notification interfaces of the sink object;

selecting an instance of the connection point interface of the source object, the selected instance having an associated interface identifier that corresponds to the interface identifier associated with the selected notification interface of the sink object;

using the selected connection point interface instance to request that the source object and the sink object be connected, wherein, the request has a reference to an instance of the selected notification interface of the sink object; and storing the reference to the instance of the selected notification interface, so that the sink object can be notified by the source object.

28. The method of claim 27, further including the step of invoking a method of the selected notification interface instance referred to by the stored reference.

29. The method of claim 27, the selected connection point interface instance for connecting to a plurality of sink objects, wherein the steps of using the selected connection point interface instance to request that the source object and the sink object be connected and storing the reference to the selected notification interface instance are performed for each sink object, and further including the step of:

invoking a method of the selected notification interface instance referred to by the stored reference for each sink object.

30. The method of claim 27, the source object having a connection point container object for managing interaction with the instances of the connection point interface and wherein the step of selecting the instance of the connection point interface includes the substep of requesting the instance of the connection point interface from the connection point container object.

31. The method of claim 27, the connection point interface having an advise member function for requesting a connection to the source object, wherein the step of using the selected connection point interface instance invokes the advise member function of the selected connection point interface instance.

32. The method of claim 27 wherein the step of selecting the instance of the connection point interface is performed under the control of code of the source object.

33. The method of claim 32, further comprising the step of, under the control of code of the sink object, requesting a connection from the selected connection point interface instance.

34. The method of claim 33 wherein the step of selecting the notification interface is performed under the control of the sink object.

35. The method of claim 27 wherein the step of storing the reference to the notification interface instance is performed under the control of the source object.

36. The method of claim 35, further comprising the step of, under the control of the sink object, requesting a connection from the selected connection point interface instance.

37. The method of claim 27, further comprising the step of, under the control of the sink object, requesting a connection from the selected connection point interface instance.

38. The method of claim 27, the computer system having an initiator object for setting up connections between the source object and the sink object, further comprising the step of, under control of the initiator object, requesting a connection; and indicating an instance of the notification interface of the sink object in the connection request.

39. A computer system for dynamically connecting objects, the system comprising:

a plurality of sink objects, each sink object having a notification function member for communicating with the sink object from the source object; and a plurality of source objects, each source object having a plurality of connection point objects, each connection point object storing a plurality of notification function members and returning an identification of one of the notification function members from the stored plurality of notification function members upon request.

40. The system of claim 39, further comprising a connection point container for storing the plurality of connection point objects within each source object, the connection point container determining which connection point object to use when an object connection is requested.

41. The system of claim 39, further comprising an invocation mechanism used by each of the connection point objects to invoke one of the stored notification function members.

42. A method in a computer system for generating an object connection between a source object and a sink object, the sink object having an instance of a notification interface for receiving communications from the source object, the notification interface having an associated interface identifier, the source object having instances of a connection point interface, each instance of the connection point interface having an associated interface identifier, the method comprising the steps of:

receiving a request to enumerate the instances of the connection point interface;

sending a reference to each instance of the connection point interface, wherein from each reference the sink object obtains an indication of the interface identifier associated with the instance;

receiving, through one of the instances of the connection point interface, a request to connect the source object and the sink object, the request having a reference to the notification interface instance of the sink object, wherein the interface identifier associated with the receiving connection point interface corresponds to the interface identifier associated with the notification interface of the sink object; and storing the reference to the notification interface instance, wherein the source object communicates with the sink object using the stored reference to the notification interface instance.

43. A method in a computer system for generating an object connection between a source object and a sink object, the sink object implementing a plurality of notification interfaces for receiving communications from the source object, each notification interface having an associated interface identifier, the source object having instances of a connection point interface, each instance of the connection point interface having an associated interface identifier, the method comprising the steps of:

receiving a request to enumerate the instances of the connection point interface;

sending to the sink object a reference to each instance of the connection point interface;

obtaining, from each referenced instance of the connection point interface, an indication of the interface identifier associated with each instance of the connection point interface;

selecting an instance of the connection point interface of the source object, the selected instance having an associated interface identifier that corresponds to a selected one of the obtained indications of interface identifiers;

selecting, from among the plurality of notification interfaces, a notification interface, the interface identifier associated with the selected notification interface corresponding to the interface identifier associated with the selected connection point interface instance;

using the selected connection point interface instance to request that the source object and the sink object be connected, wherein the request has a reference to an instance of the selected notification interface of the sink object; and storing the reference to the instance of the selected notification interface, so that the sink object can be notified by the source object.

44. A computer system for notifying a sink object from a source object, the computer system having a plurality of sink objects and source objects, each sink object having a plurality of notification function members, each source object having a plurality of connection points for storing one or more notification function members, the system comprising:

means for selecting a notification function member from among the plurality of function members of the sink object;

means for selecting a corresponding connection point from among the plurality of connection points of the source object, the selection based upon the notification function member that is selected by the notification function member selection means;

means for connecting the connection point selected by the connection point selection means and the notification function member selected by the notification member selection means, wherein a reference to the selected notification function member is stored within the selected connection point; and means for invoking the selected notification function member referred to by the stored reference to effect notification of the sink object.

45. The system of claim 44 wherein the plurality of connection points of each source object is stored within a connection point container, and wherein the means for selecting a [connecting] *connection* point uses the connection point container to determine which connection point to select.

*46. A computer-readable medium having computer-executable instructions for performing steps to generate an object connection between a source object and a sink object, the sink object implementing a plurality of notification interfaces for communicating with the source object, each notification interface having an associated interface identifier, and the source object having instances of a connection point interface identifier, each instance of the connection point interface having an associated interface identifier, the steps comprising;*

*selecting a notification interface from among the plurality of notification interfaces of the sink object;*

*selecting an instance of the connection point interface of the source object, the selected instance having an associated interface identifier that corresponds to the interface identifier associated with the selected notification interface of the sink object;*

*using the selected connection point interface instance to request that the source object and the sink object be connected, wherein the request has a reference to an instance of the selected notification interface of the sink object; and*

*storing the reference to the instance of the selected notification interface, so that the sink object can be notified by the source object.*

*47. A computer-readable medium having stored thereon an object connection architecture comprising:*

*a plurality of sink objects, each sink object having a notification function member for communicating with the sink object from a source object; and*

*a plurality of source objects, each source object having a connection point object, each connection point object storing a notification function member and returning an identification of the notification function member upon request.*

*48. A computer-readable medium having computer-executable instructions for causing a computer system comprising a plurality of sink objects and a plurality of source objects to dynamically connect source and sink objects by:*

*communicating with a sink object from a source object via a notification interface;*

*storing a plurality of notification interfaces referenced by a plurality of connection point objects wherein each source object is coupled to a connection point object; and*

*returning an identification of one of the notification interfaces from the stored plurality of notification interfaces upon request.*

*49. A computer-readable medium having computer-executable instructions stored thereon for causing a computer system to generate a connection between a source object and a sink object, the object having an instance of a notification interface for receiving communications from the source object, the notification interface having an associated interface identifier, the source object having instances of a connection point interface, each instance of the connection point interface having an associated interface identifier, the computer system directed by said instructions to perform the steps comprising:*

*receiving a request to identify instances of the connection point interface;*

*sending a reference to each instance of the connection point interface, wherein from each reference the sink object obtains an indication of the interface identifier associated with the instance;*

*receiving, through one of the instances of the connection point interface, a request to connect the source object and the sink object, the request having a reference to the notification interface instance of the sink object, wherein the interface identifier associated with the receiving connection point interface corresponds to the interface identifier associated with the notification interface of the sink object; and*

*storing the reference to the notification interface instance, wherein the source object communicates with the sink object using the stored reference to the notification interface instance.*

*50. A computer-readable medium having computer-executable instructions for causing a computer system to dynamically notify a sink object from a source object, the computer system having a plurality of sink objects and source objects, each sink object having a notification interface, each source object having a connection point for referencing one or more notification interfaces, the computer system performing a method comprising:*

*selecting a notification interface of the sink object;*

*selecting a corresponding connection point of the source object, the selection based upon the notification interface that is selected;*

*connecting the connection point selected and the notification interface selected, wherein a reference to the selected notification interface is stored by the selected connection point; and*

*invoking the selected notification interface referred to by the stored reference to effect notification of the sink object.*

*51. A computer system for dynamically connecting objects, the system comprising:*

*a plurality of sink objects, each sink object having a notification interface for communicating with the sink object from the source object; and*

*a plurality of source objects, each source object having a connection point object, each connection point object storing a notification interface and returning an identification of the notification interface upon request.*

*52. A computer system for notifying a sink object from a source object, the computer system having a plurality of sink objects and source objects, each sink object having a notification interface, each source object having a connection point for storing one or more notification interfaces, the system comprising:*

*means for selecting a notification interface;*

*means for selecting a corresponding connection point, the selection based upon the notification interface that is selected by the notification interface selection means;*

*means for connecting the connection point selected by the connection point selection means and the notification interface selected by the notification interface selection means, wherein a reference to the selected notification interface is stored within the selected connection point; and*

*means for invoking the selected notification interface referred to by the stored reference to effect notification of the sink object.*

*53. A computer readable medium having objects stored thereon for causing a computer system to dynamically connect objects, the objects stored on the medium comprising:*

*a plurality of sink objects, each sink object having a notification interface for communicating with the sink object from the source object; and*

*a plurality of source objects, each source object having a connection point object, each connection point object storing a notification interface and returning an identification of the notification interface upon request.*

* * * * *